United States Patent
Tripathi (10) Patent No.: US 7,290,055 B2
(45) Date of Patent: Oct. 30, 2007

(54) MULTI-THREADED ACCEPT MECHANISM IN A VERTICAL PERIMETER COMMUNICATION ENVIRONMENT

(75) Inventor: Sunay Tripathi, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 852 days.

(21) Appl. No.: 10/683,720

(22) Filed: Oct. 10, 2003

(65) Prior Publication Data

US 2005/0125539 A1   Jun. 9, 2005

Related U.S. Application Data

(60) Provisional application No. 60/465,147, filed on Apr. 23, 2003.

(51) Int. Cl.
*G06F 13/00* (2006.01)
(52) U.S. Cl. ............... 709/229; 709/226; 709/237; 718/104
(58) Field of Classification Search ............... 709/217, 709/219, 223, 225, 227, 229
See application file for complete search history.

(56) References Cited

U.S. PATENT DOCUMENTS

| 5,978,849 | A  | * | 11/1999 | Khanna ............... 709/227 |
| 6,389,448 | B1 | * | 5/2002  | Primak et al. ............... 718/105 |
| 7,140,021 | B2 | * | 11/2006 | Srinivas et al. ............... 718/104 |
| 2001/0042200 | A1 | * | 11/2001 | Lamberton et al. ......... 713/151 |
| 2003/0074467 | A1 | * | 4/2003  | Oblak et al. ................ 709/238 |

* cited by examiner

*Primary Examiner*—Viet D. Vu
(74) *Attorney, Agent, or Firm*—Martine Penilla & Gencarella, LLP (57) ABSTRACT

A multi-threaded accept in a vertical perimeter communication environment is disclosed. Embodiments of the present invention include a method for processing a connection in a multi-processor server system comprising receiving a connection indicator packet on a listener of the server system wherein the connection indicator packet is associated with a connection to be established. In response to the connection indicator, generating a connection data structure defining a connection path for the connection and assigning the path to a processor of the multi processor server. The path transmits a first acknowledgement packet in response to the connection indicator wherein the listener is free to process subsequent packets. The path receives a second acknowledgement packet to establish the connection on the processor and the path processes a plurality of data packets on the processor associated with the connection, wherein the data packets are identified with the path based on the data structure. By offloading a portion of the communication processing from the listener, the listener can service a new client faster, thus reducing latency and easing a critical bottleneck in a server system.

27 Claims, 8 Drawing Sheets

```
┌─────────────────────────────────────────────────────────────────┐
│ IN A MULTI-PROCESSOR SERVER SYSTEM, RECEIVING A CONNECTION      │
│ REQUEST PACKET ON A LISTENER THAT IS ASSOCIATED WITH A          │
│ CONNECTION TO BE ESTABLISHED                                     │
│                            701                                   │
└─────────────────────────────────────────────────────────────────┘
                                │
                                ▼
┌─────────────────────────────────────────────────────────────────┐
│ IN RESPONSE, GENERATING A CONNECTION DATA STRUCTURE DEFINING A  │
│ CONNECTION PATH FOR THE CONNECTION AND ASSIGNING THE PATH TO A  │
│ SINGLE PROCESSOR                                                 │
│                            703                                   │
└─────────────────────────────────────────────────────────────────┘
                                │
                                ▼
┌─────────────────────────────────────────────────────────────────┐
│ THE PATH TRANSMITTING A FIRST ACKNOWLEDGEMENT PACKET IN RESPONSE│
│ TO THE CONNECTION INDICATOR WHEREIN THE LISTENER IS FREE TO     │
│ PROCESS SUBSEQUENT REQUEST                                       │
│                            705                                   │
└─────────────────────────────────────────────────────────────────┘
                                │
                                ▼
┌─────────────────────────────────────────────────────────────────┐
│ THE PATH RECEIVING A SECOND ACKNOWLEDGEMENT PACKET TO ESTABLISH │
│ THE CONNECTION ON THE PROCESSOR                                  │
│                            707                                   │
└─────────────────────────────────────────────────────────────────┘
                                │
                                ▼
┌─────────────────────────────────────────────────────────────────┐
│ ON THE PATH, PROCESSING A PLURALITY OF PACKETS ON THE SINGLE    │
│ PROCESSOR ASSOCIATED WITH THE CONNECTION WHEREIN THE DATA       │
│ PACKETS ARE IDENTIFIED WITH THE PATH BASED ON THE DATA STRUCTURE│
│                            709                                   │
└─────────────────────────────────────────────────────────────────┘
```

FIGURE 7

MULTI-THREADED ACCEPT MECHANISM IN A VERTICAL PERIMETER COMMUNICATION ENVIRONMENT

CROSS REFERENCE TO RELATED APPLICATIONS

This application claims priority to the co-pending U.S. Provisional Patent Application No. 60/465,147 entitled "Vertical Perimeter Protection Mechanism" by Sunay Tripathi, filed Apr. 23, 2003 and is also incorporated herein by reference.

U.S. patent application Ser. No. 10/683,933 entitled "A System And Method For Vertical Perimeter Protection" by Sunay Tripathi, Bruce Curtis filed Oct. 10, 2003 is incorporated herein by reference.

U.S. patent application Ser. No. 10/683,897 entitled "A Method And System For Processing Communications Packets According To Event Lists" by Sunay Tripathi and E. Nordmark, filed Oct. 10, 2003 is incorporated herein by reference.

U.S. patent application Ser. No. 10/683,959 entitled "Running A Communication Protocol State Machine Through A Packet Classifier" by Sunay Tripathi and Bruce Curtis, filed Oct. 10, 2003 is incorporated herein by reference.

U.S. patent application Ser. No. 10/683,934 entitled "A Method For Batch Processing Received Message Packets" by Sunay Tripathi and S. Kamatala, filed Oct. 10, 2003 is incorporated herein by reference.

U.S. patent application Ser. No. 10/683,762 entitled "A Method and System For Transmitting Packet Chains" by Sunay Tripathi, Bruce Curtis and C. Masputra, filed Oct. 10, 2003 is incorporated herein by reference.

BACKGROUND

Computer systems typically utilize a layered approach for implementing functionalities relating to communications frameworks where a layer is a program module for processing different portions of data traveling from a producer to a consumer. Each protocol (e.g., TCP, IP, etc.) is implemented as a layer and each connection can be visualized as a layer of protocol modules through which each incoming or outgoing packet has to pass. Each layer examines the data to determine if any work needs to be performed by that layer before sending the data to the next layer.

Conventional accept mechanisms process new connections on the listener and the three-way handshake and connection indication are done in the listener context. The messages used to perform the accept of a new connection are sent on the listener stream and the listener stream is single threaded during the accept process. As a result, the listener can become a bottleneck during times of heave traffic because the listener can not accept new connections while processing other connections.

SUMMARY

In accordance with an embodiment of the present invention the connection setup handling on the server's endpoint is shared between a listener stream and an acceptor stream. More specifically, the listener stream on the server waits for a connection (e.g., connection indicator), creates a connection data structure (e.g., conn_t) specific to the new connection, sets up an acceptor communication stream and processes the communication between the client and the server on the new stream. In one embodiment of the invention, the TPI (transport provider interface) messages including a T_CONN_IND signal (connection indicator), a T_CONN_RES signal (connection response), and a T_CONN_ACK signal (connection acknowledgement) are passed along the listener and acceptor streams.

For example, on receiving a T_CONN_IND message from the transport layer (e.g., TCP layer), the socket layer creates a new stream, generates a connection data structure for the new connection and passes a T_CONN_RES message to the TCP layer. The TCP layer then swaps an already created eager connection with the newly created stream and sends a T_CONN_ACK signal acknowledgement to the sockfs on the listener stream. The listener on the server can be the bottleneck in a heavily loaded system, where there are simultaneous connection indicators on the same listener. The present invention offloads a portion of the load assigned to the listener during the connection setup process thus achieving higher performance.

Embodiments of the present invention include a computer implemented method for connecting a server system to a client where the method includes receiving a TCP connection on a server from a client, wherein the TCP connection is received by a first TCP control block coupled to a first communication stream and coupled to a socket on the server. After receiving the TCP connection, the method includes creating a connection structure specific to the new connection, creating a second TCP control block on the server; sending a connection indicator from the first TCP control block to the socket and creating a second communication stream between the socket and the second TCP control block. After the second TCP control block is created, and after a connection indicator is sent from the first TCP to the socket, the method further includes transferring the TCP connection from the first communication stream to the second communication stream; and returning a connection response to the client through the second TCP control block and through the second communication stream. By offloading a portion of the communication processing from the listener stream to the acceptor stream, the listener stream can service a new client faster, thus reducing latency and easing a critical bottleneck in a server system.

Embodiments of the present invention provide an accept mechanism that establishes an incoming connection in its own perimeter as soon as a SYN (e.g., connection indicator) packet arrives. The connection indication is sent to the listener on the listener's stream and the accept messages are sent over the newly created acceptor stream. As a result, sockfs is not single threaded at any time during the accept processing.

These and other objects and advantages of the present invention will no doubt become obvious to those of ordinary skill in the art after having read the following detailed description of the preferred embodiments, which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention as set forth in the claims.

DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

Notation and Nomenclature

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

Figure 7:
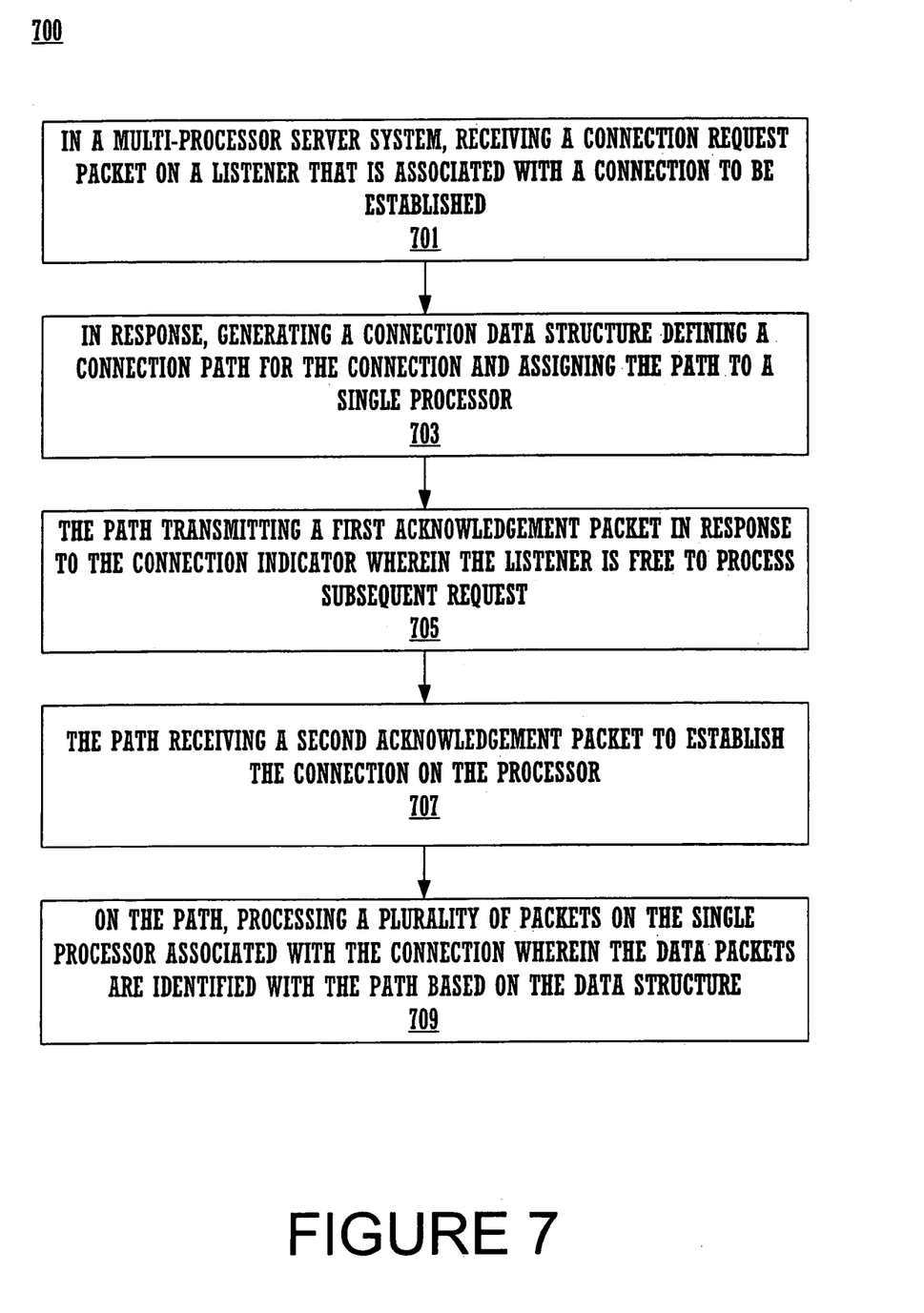
FIG. 7 is a flow diagram of an exemplary process for processing a connection on a multi-processor server system in a vertical perimeter communication environment in accordance with embodiments of the present invention.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "creating," "connecting," "transferring," "sending," "updating," "entering", "computing" or the like, refer to the action and processes (e.g., process 700) of a computer or computerized server system or similar intelligent electronic computing device, that manipulates and transforms data represented as physical (electronic) quantities within the computer system's registers and memories into other data similarly represented as physical quantities within the computer system memories or registers or other such information storage, transmission or display devices.

Figure 1:
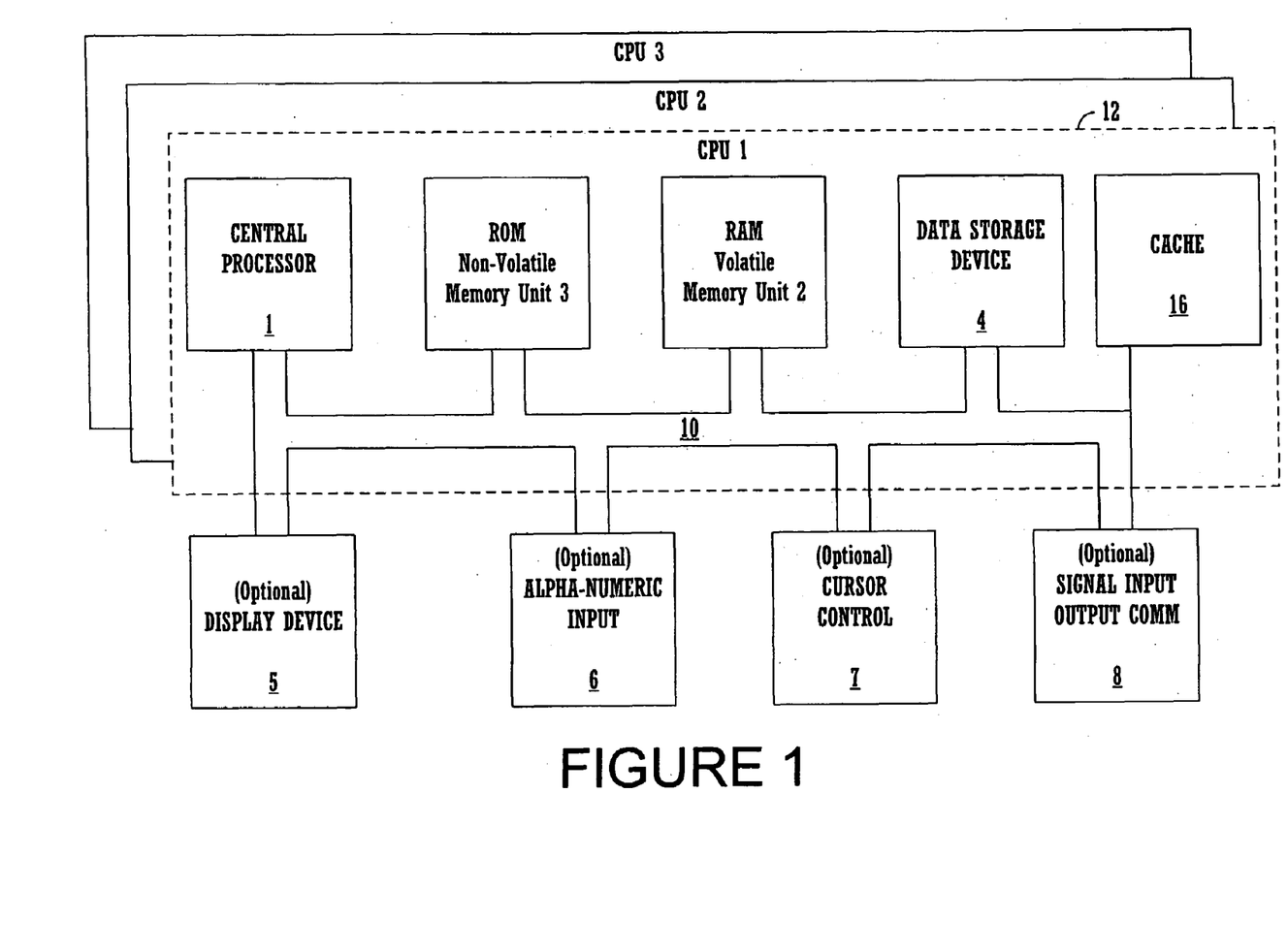
FIG. 1 is a logical block diagram of an exemplary embedded computer or server system comprising a plurality of processors in accordance with an embodiment of the present invention.

Referring now to FIG. 1, a block diagram of exemplary computer system 12 is shown. It is appreciated that computer system 12 of FIG. 1 described herein illustrates an exemplary configuration of an operational platform upon which embodiments of the present invention can be implemented. Nevertheless, other computer systems with differing configurations can also be used in place of computer system 12 within the scope of the present invention. For example, computer system 12 could be a server system, a personal computer, an embedded computer system or a system in which one or more of the components of the computer system is located remotely and accessed via a network.

Computer system 12 may include multiple processors and includes an address/data bus 10 for communicating information, a central processor 1 coupled with bus 10 for processing information and instructions, a cache 16 coupled to bus 10 for temporarily storing data, a volatile memory unit 2 (e.g., random access memory, static RAM, dynamic RAM, etc.) coupled with bus 10 for storing information and instructions for central processor 1 and a non-volatile memory unit 3 (e.g., read only memory, programmable ROM, flash memory, EPROM, EEPROM, etc.) coupled with bus 10 for storing static information and instructions for processor 1. Computer system 12 may also contain an optional display device 5 coupled to bus 10 for displaying information to the computer user. Moreover, computer system 12 also includes a data storage device 4 (e.g., disk drive) for storing information and instructions.

Also included in computer system 12 of FIG. 1 is an optional alphanumeric input device 6. Device 6 can communicate information and command selections to central processor 1. Computer system 12 also includes an optional cursor control or directing device 7 coupled to bus 10 for communicating user input information and command selections to central processor 1. Computer system 12 also includes signal communication interface 8, which is also coupled to bus 10, and can be a serial port. It is noted that the components associated with system 800 described above may be resident to and associated with one physical computing device. However, one or more of the components associated with system 800 may be physically distributed to other locations and be communicatively coupled together (e.g., via a network).

Vertical Perimeter Protection

A TCP connection provides for full duplex data transfer. That is, application-level data can be transferred in both directions between two hosts. For example, if there is a TCP connection between process A on one host and process B on another host, then application-level data can flow from A to B at the same time as application-level data flows from B to A. A TCP connection is also point-to-point, e.g., between a single sender and a single receiver. As a result, multicasting (the transfer of data from one sender to many receivers in a single send operation) is not generally performed with TCP.

When a process running in one host needs to initiate a connection with another process in another host, a TCP connection is required. The host that is initiating the connection is called the "client," while the other host is called the "server." These connotations will be used herein. The client application process first informs the client TCP layer that it needs to establish a connection to a process in the server.

Generally, the TCP layer in the client then proceeds to establish a TCP connection with the TCP layer in the server. The client first sends a special TCP segment, the server responds with a second special TCP segment; and the client responds again with a third special segment. The first two segments contain no "payload," e.g., no application-layer data. The third of these segments may carry a payload. Because three segments are sent between the two hosts, this connection establishment procedure is often referred to as a three-way handshake.

Figure 2:
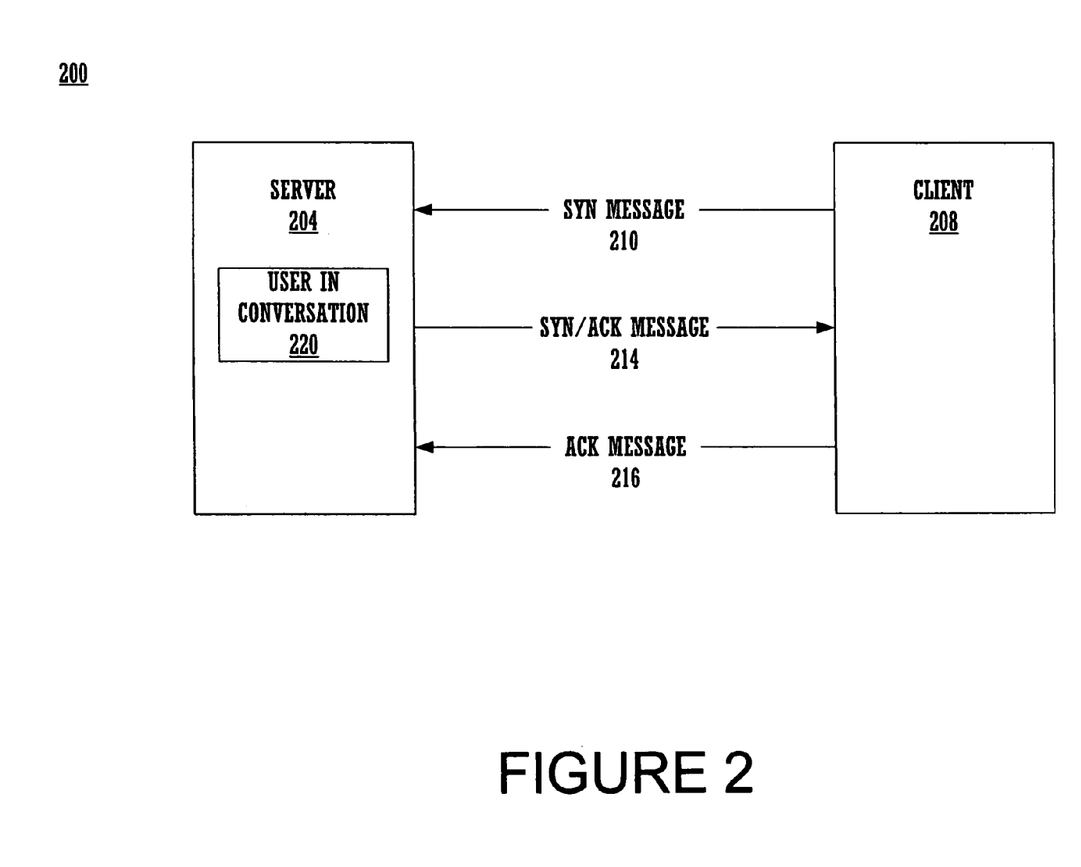
FIG. 2 is a block diagram of an exemplary server-client system wherein a three-way handshake is used to create a communication connection in accordance with an embodiment of the present invention.

FIG. 2 is a data flow diagram of an exemplary server-client system 200 wherein a three-way handshake is executed to make a TCP connection between the server 204 and the client 208. The three-way handshake is initiated from the client 208 with a "SYN" (SYNC) message 210 from one unique address to the TCP/IP server 204. The SYN message notifies the server 204 that the client 208 needs to communicate. The client 208 first sends the server 204 its address (this is part one of the three way handshake) and the server 204 creates a new connection structure 'conn_t' to handle this connection. This conn_t is also referred to as an 'eager conn_t'. The server then inserts the 'eager conn_t'in the IP classifier such that all future incoming packets for this connection can find the 'eager conn_t' after classification. This method is advantageous compared to standard TPI implementation where the 'eager conn_t' is stored in a private table accessible only from listener requiring the listener to handle the 3$^{rd}$ step of the three-way handshake and any subsequent data packets that client sends before new STREAM is created. The server 204 then sends a "SYN/ACK" (SYNC/acknowledgement) message 214 back to the client 208 to let the client know that it can begin to communicate with the server 204 (this is part two of the three-way handshake). The client 208 then sends an ACK message back to the server 204 and begins communication with the server (this is part three of the three-way handshake). The ACK and any subsequent data packets are processed on the 'eager conn_t' already established to handle this connection.

Figure 3:
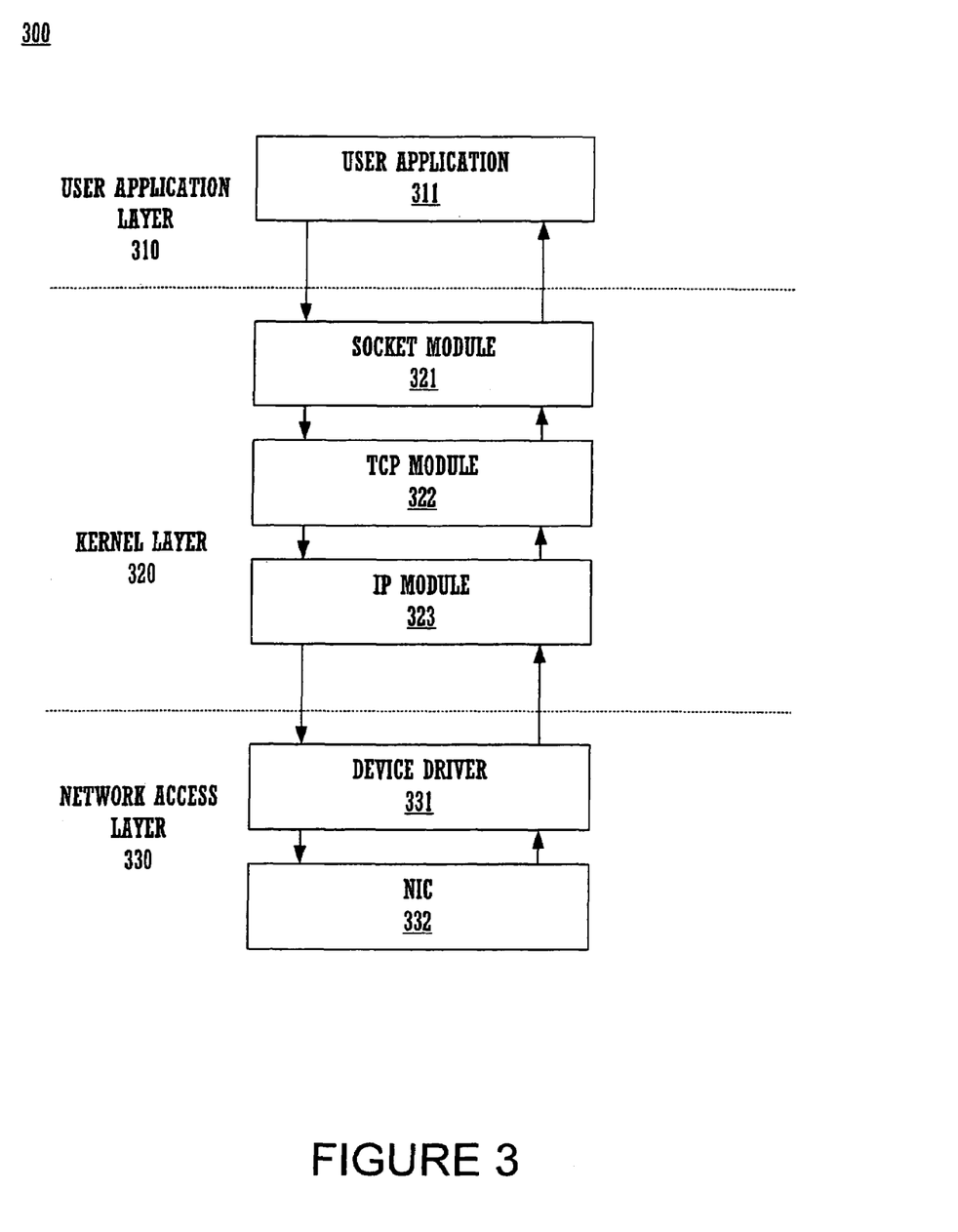
FIG. 3 is a block diagram of an exemplary communication connection comprising a user application layer, a kernel layer and a network access layer in accordance with an embodiment of the present invention.

FIG. 3 is a software layer illustration of a communication connection 300 comprising a user application layer 310, a kernel layer 320 and a network access layer 330. In accordance with the embodiment of FIG. 3, user application layer 310 comprises a user application 311 that provides a set of services for clients over the networks.

Kernel layer 320 comprises a variety of modules that perform specific functions when passing message packets upstream (e.g., from network access layer 330 to user application layer 310) and downstream (e.g., from user application layer 310 to network access layer 330). In accordance with an embodiment of the present invention, kernel layer 320 comprises protocol layers including socket module 321, transfer control protocol (TCP) module 322, and Internet protocol (IP) module 323. The modules comprising kernel layer 320 can be mapped to corresponding layers of the TCP/IP suite of protocols. That is, socket module 321 corresponds to the application layer of the TCP/IP protocol. Similarly, TCP module 322 and IP module 323 correspond to the transport and network layers, respectively of the TCP/IP suite of protocols. It is appreciated that in embodiments of the present invention, communication connection 300 may utilize other modules (e.g., a firewall module) in kernel layer 320. Furthermore, it is appreciated that the connection state for individual modules of connection 300 may be incorporated into a single connection structure called 'conn', wherein the modules are not distinct modules, but a culmination of modules merged together (e.g., a merged TCP/IP module).

Network access layer 330 provides physical access to communications network and corresponds to the network interface layer of the TCP/IP suite of protocols. Network access layer 330 comprises a device driver 331 and a NIC 332. It is appreciated that once a connection is established, it is generally maintained on the same NIC (e.g., once a connection is established on a particular NIC, all subsequent packets of that connection will be sent and received on the same NIC). The process and hardware required to maintain a connection on the same NIC are well known in the art. Any number of well-known protocol layers 321-323 can be used in accordance with the present embodiment.

Figure 4:
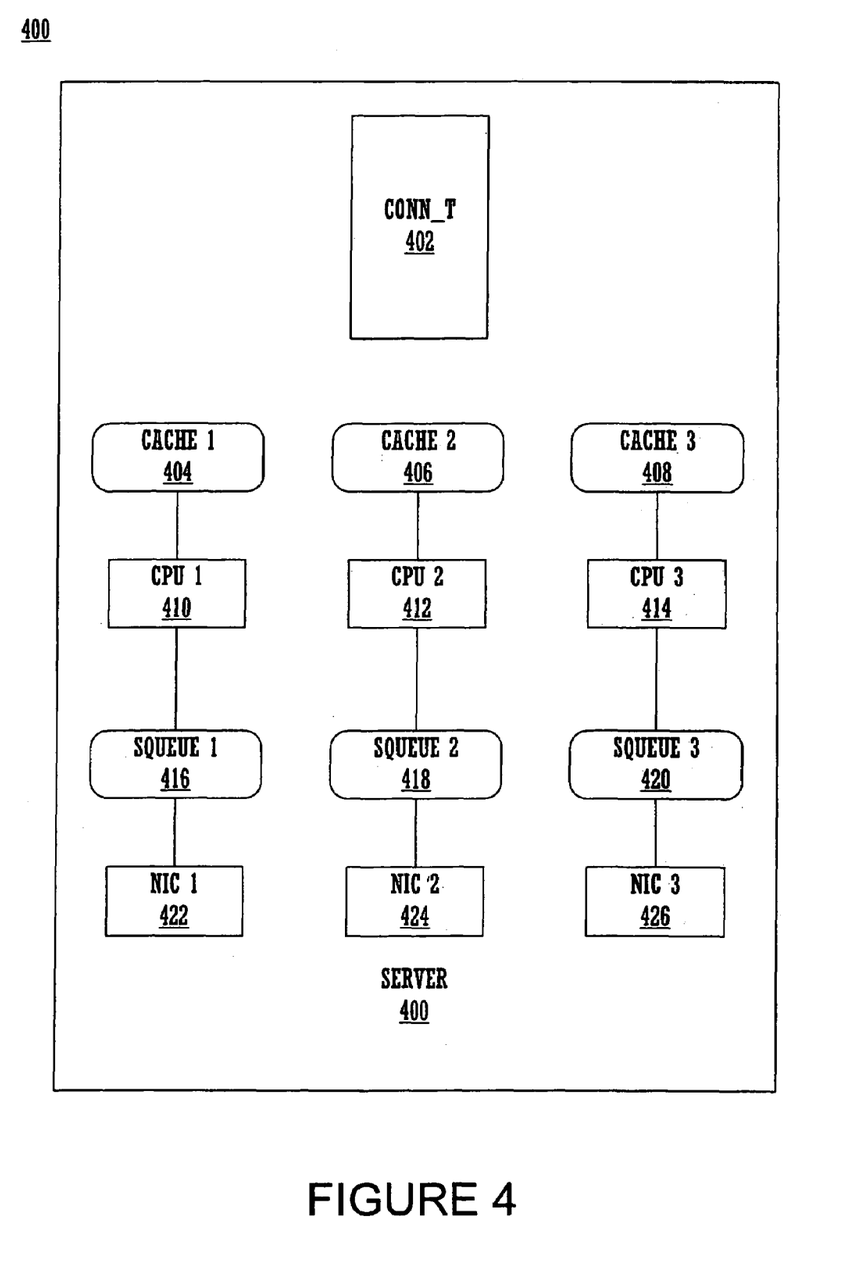
FIG. 4 is a block diagram of an exemplary server system wherein packets associated with a connection are assigned, routed and processed by the same processor in accordance with an embodiment of the present invention.

FIG. 4 is an illustration of an exemplary multiprocessor server system 400 comprising a plurality of network interface cards (NICs), e.g., NICs 422, 424, and 426 that provide a connection interface to a client (e.g., a port) in accordance with the an embodiment of present invention. Exemplary server 400 also comprises a plurality of central processing units (CPUs) or processors wherein each NIC is assigned to a specific CPU (e.g., NIC 422 is assigned to CPU 410). The present embodiment provides a system for per CPU synchronization called "vertical perimeters" inside a merged TCP/IP module. The vertical perimeter is implemented using a serialization queue, or data structure called 'squeue' in one embodiment. Table 1 comprises an exemplary data structure for 'squeue' in accordance with one embodiment of the present invention.

TABLE 1

| #define | SQS_PROC 0x0001 | |
|---|---|---|
| typedef struct squeue { | | |
| int_t | sq_flag; | /* Flags tells squeue status */ |
| kmutex_t | sq_lock; | /* Lock to protect the flag etc */ |
| mblk_t | *sq_first; | /* First Queued Packet */ |
| mblk_t | *sq_last; | /* Last Queued Packet */ |
| thread_t | sq_worker; | /* the worker thread for squeue */ |
| } squeue_t; | | |

The functionality of the queue is described as follows. Each CPU of the server system has an associated 'squeue' (serialization queue) for queuing packets destined for the associated CPU (e.g., 'squeue' 416 queues packets destined for CPU 410). In addition, each CPU has an optional limited amount of associated cache memory for storing connection information for current connections amongst other information CPU needs. For example, cache 404 is associated with CPU 410 and could store information about connections associated with CPU 410. For example, embodiments of the present invention use a connection data structure called 'conn' that classifies each connection and provides routing information such that all packets associated with the connection are routed to a single assigned processor. The details of the 'conn' connection structure are discussed in greater detail below. Both 'conn' and 'squeue' data structures can reside in a computer readable memory.

As described further below, the 'squeue' data structure queues tasks to be performed by its associated processor. In one embodiment of the present invention this includes the processing of a communication packet that may be associated with a TCP connection. In accordance with embodiments of the present invention, once the processing starts for a data packet, the same processor will process the packet through the protocol layers 321-323 (FIG. 3) without requiring additional locks or queuing the packet between protocol layers. Furthermore, the same processor will similarly process all other packets of that TCP connection.

As described below, 'conn' data structure is used and associated with a TCP connection and stores a pointer to the 'squeue' its associated with and can be used to route packets to their respective processors. This is true for in-bound and out-bound packets.

The connection data structure ('conn') lookup for inbound packets is done outside the perimeter, using an IP connection classifier, as soon as a packet reaches the IP portion of the merged TCP/IP module. Based on the classification, the 'conn' (connection structure) is retrieved from a memory resident connection classifier hash table (conn_t) table 402. For new connections, creation of 'conn', assigning it to a 'squeue' and inserting it in the connection classifier hash table (e.g., conn_t 402) happens outside the vertical perimeter. As a result, all packets for the same connection are processed on the 'squeue' to which it is bound. Advantageously, processing all packets associated with a connection on the same processor decreases processing time for the packet by reducing data state conflicts between protocol layers, for instance. Furthermore, a localized cache can be used in accordance with embodiments of the invention to further decrease processing time.

When a packet is received from a NIC (e.g., NIC 424), an interrupt thread classifies the packet and retrieves the connection structure (e.g., 'conn') and the instance of the vertical perimeter or 'squeue', on which the packet needs to be processed. For a new incoming connection, the connection is assigned to the vertical perimeter instance attached to the interrupted CPU associated with the NIC, on which the connection was received. For outbound processing, the 'conn' can also stored in the file descriptor for the connection so that the 'squeue' can be retrieved from the 'conn'.

Vertical perimeters advantageously assure that only a single thread can process a given connection at any time, thus serializing access to the TCP connection structure by multiple threads (from both read and write sides) in a merged TCP/IP module. Compared to a conventional STREAMs QPAIR perimeter, a vertical perimeter protects the whole connection state from IP to sockfs instead of merely protecting a module instance. As discussed further below, once a packet is being processed through the protocol layers by its processor, the thread is usually not interrupted unless to schedule a new task on its queue.

Figure 5:
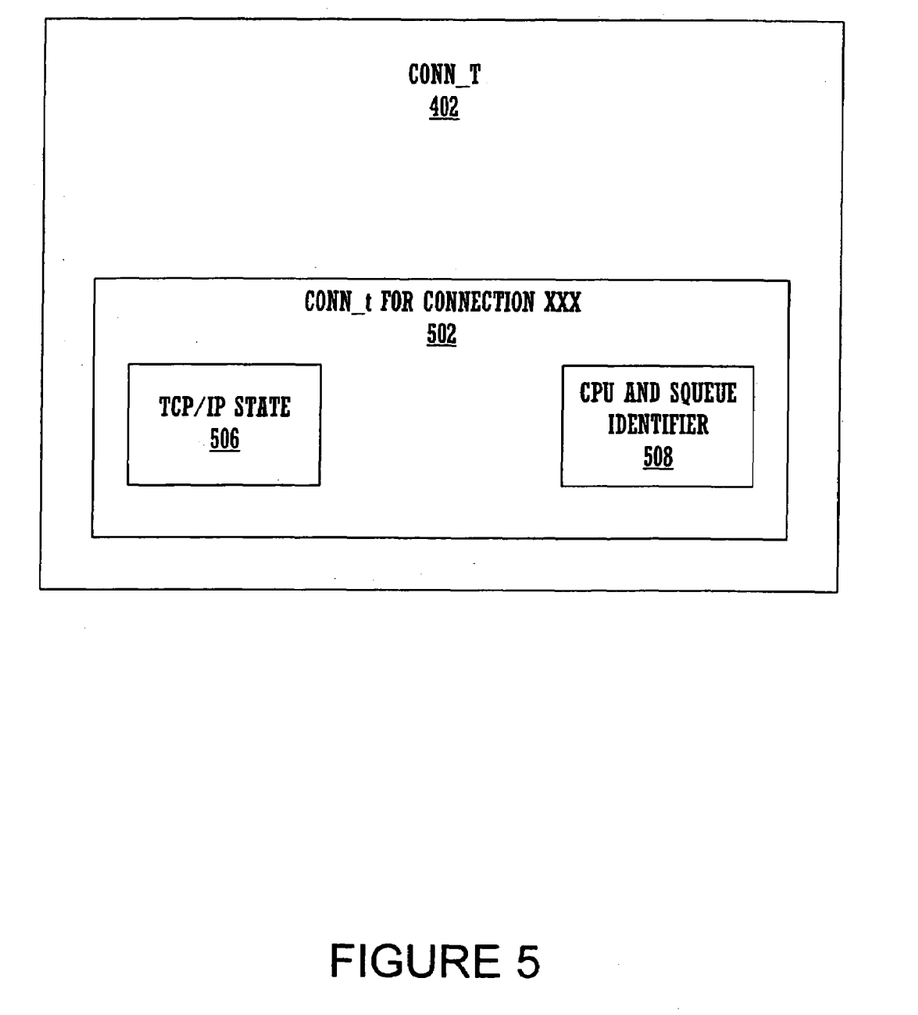
FIG. 5 is a block diagram of an exemplary connection structure used to classify a connection in accordance with an embodiment of the present invention.

FIG. 5 is a block diagram of an exemplary 'conn' (connection data structure) 402 in accordance with an embodiment of the present invention. The 'conn_t' 402 stores information specific to a connection established on a server (e.g., server 400 from FIG. 4). When a new connection is established, a 'conn_t' is automatically created and stored in a memory resident database. The 'conn_t', in one embodiment of the present invention, comprises a connection state 506, and a 'squeue' 508 to which it is attached. It is appreciated that the 'conn' can also include various other entries to facilitate the processing of packets associated with the particular connection. In one embodiment of the invention, the squeue 508 also comprises a CPU identifier that defines a single processor for which the squeue is processed on.

Table 2 illustrates an exemplary connection structure ('conn') used in one embodiment of the present invention.

TABLE 2

```
typedef struct conn {
    uint32_t      conn_ref;      /* Reference counter */
    uint32_t      conn_flags;    /* Flags */
    squeue_t      *conn_sqp;     /* squeue the conn will be processed on */
    /* Other connection state */
    } conn_t;
```

In one embodiment of the invention, when a packet is received, classification information (e.g., connection address information) is retrieved from the header portion of the packet and a hash index is computed based on which the associated 'conn' is retrieved from the CPU and squeue identifier 508. If an entry is not found, a 'conn' is created using the connection address information as the connection identifier. The 'squeue' identifier 508 defines the specific CPU that the connection is assigned to and is also stored in the 'conn'. This information routes packets for this connection to the proper processor.

Figure 6A:
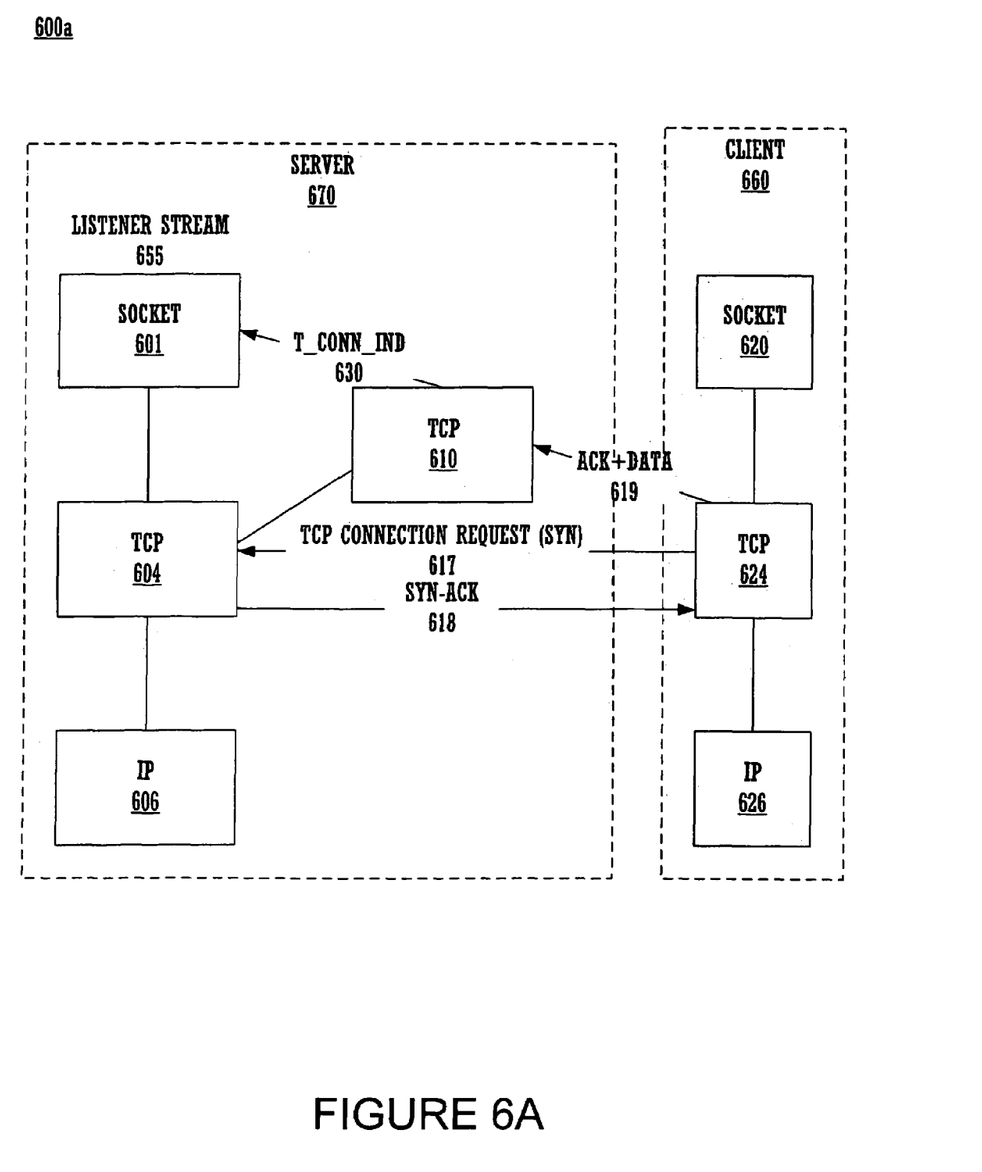
FIG. 6A is a block diagram of an exemplary server system showing a TCP connection between a client and a server in accordance with an embodiment of the present invention.

FIG. 6A illustrates an exemplary implementation of a server architecture used to make a connection between a server 670 and a client 660. To set-up a TCP connection, a client 660 initiates a connection request with a server 670 by, for example, dialing in to a modem pool, which is intercepted by point-to-point stack software, which conforms information received to the Listener TCP 604, which obtains a new socket 601 (from FIG. 6B) for connecting the client 660 to the server 670. In one embodiment of the invention, a listener 655 on server 670 listens for connections with a client 660. The client 660 makes the connection with the server 670 by sending the server a TCP connection request 617.

In response to the TCP connection request (SYN) 617 sent by the client, the server sets-up a new TCP control block (e.g., TCP layer) 610 to communicate with the client TCP 624. In one embodiment, the server identifies connection attributes (e.g., local IP address, remote IP address, local port and remote port addresses) and creates a connection structure "conn" (e.g., conn data structure 402) and inserts it in the classifier table. The data structure contains protocol state information and is also used to route subsequent data packets associated with the connection to the same processor of a multi-processor server system. The listener TCP 604 then replies back with a SYN-ACK 618 message. The client TCP 624 receives the SYN-ACK and responds with a ACK 619 to complete the three-way handshake and is free to send any data afterwards. The ACK 610 is received by the Server 670 which classifies the packet and finds the TCP 610 and passes the packet to the new TCP control block 610 on the server 670 will communicate with the TCP layer 624 on the client 660 after the connection setup is complete. TCP 610 sends a connection indicator to listener socket 610. All this while, the listener STREAM 655 is free to process other connection requests.

Figure 6B:
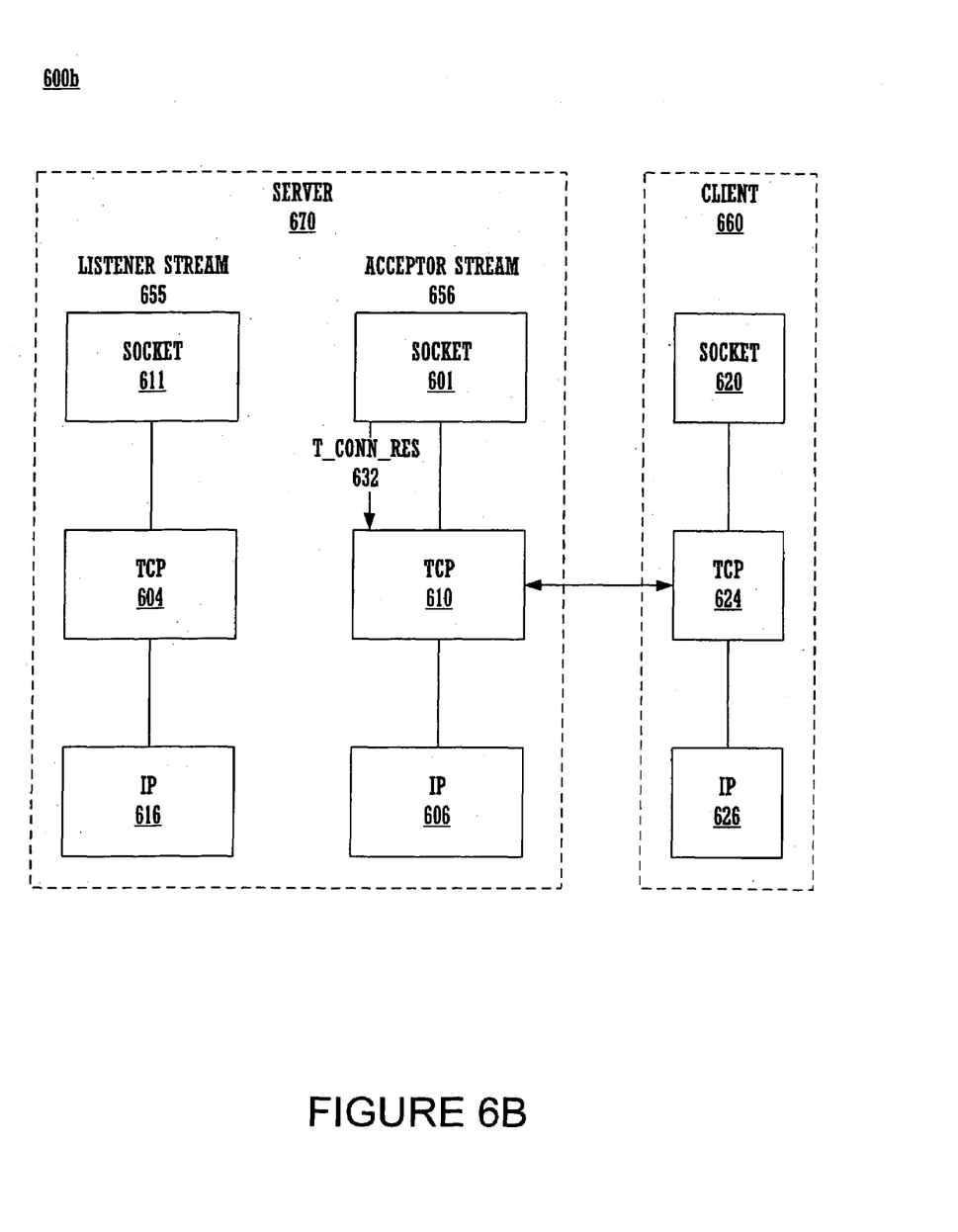
FIG. 6B is a block diagram of an exemplary server system wherein a new path is created after a connection response is sent from a socket to a TCP on a server in accordance with an embodiment of the present invention.

FIG. 6B illustrates an implementation of a server architecture used to make a connection between a server 670 and a client 660. Specifically, FIG. 6B illustrates a newly created communication path (acceptor path 656) after the connection indication, for example, a T_CONN_IND message 630 is sent from the TCP connection 610 to the socket 601. Once the acceptor path 656 is created, TCP control block 610 is tied to the STREAM 656 by means of socket 601 sending a T_CONN_RES on the acceptor STREAM 656 and communication between the client 660 and the server 670 is done over the acceptor path 656. The listener path 655 is available to service new clients and is not required to complete the setup of new connection other than receiving a connection request 617, creating a new TCP control block 610 and processing the connection indication 630. These steps are done asynchronously and listener doesn't need to be single threaded at any point (e.g., listener can service other connection request in between any of the steps). In response to the connection indicator 630, the socket 601 replies to TCP 610 with a connection response message 632, for example T_CONN_RES, that notifies the TCP 604 that a new path is set-up and the connection should be transferred to the newly created TCP 610. The new path will connect the new TCP control block 610 with the client 660. The new path 656 will process the rest of the connection accept process. In one embodiment of the invention, the listener stream is not single threaded during the accept of a new connection.

FIG. 7 is a flow diagram of an exemplary process for processing a connection on a multi-processor server system in accordance with embodiments of the present invention. Step 701 comprises receiving a connection indicator packet on a listener that is associated with a connection to be established. In one embodiment of the invention, the connection indicator packet is a SYN packet associated with a three-way handshake used to establish a connection, for example between a client and a server. In one embodiment of the invention, the listener is a module responsible for processing new connections on a server system. In response to the connection request packet, in step 703, a data connection structure is generated that defines the connection state for the connection and the connection is also assigned to a single processor. In one embodiment of the invention, the connection structure is a conn_t data structure. In step 705, the path transmits a first acknowledgement packet in response to the connection request wherein the listener is free to process subsequent packets.

In one embodiment of the invention, the listener is not single threaded while processing a connection. In step 707, the path receives a second acknowledgement packet to establish the connection on the processor. In one embodiment of the invention, the first and second acknowledgement packets are associated with a three-way handshake. In step 709, the path processes a plurality of packets on the single processor associated with the connection wherein the packets are identified with the path based on the data structure generated in step 703.

The accept mechanism of the present invention establishes an incoming connection in its own perimeter as soon as the SYN packet arrives and inserts in the classifier so that subsequent packets can be processed on perimeter of the new connection. The connection indication may be sent on the listener stream, but the accept occurs on a newly created acceptor stream. As a result, there is no need to allocate extra data structures for the new acceptor stream since its known that the necessary data structures were created when listener serviced the connection request. The acknowledgement for the connection request can be sent on the acceptor stream. In one embodiment of the invention, sockfs does not become single threaded at any time during the accept processing, thus increasing the accept rate for new connections, especially while heavily loaded.

Embodiments of the present invention, a multi-threaded accept in a vertical perimeter communications environment has been described. While the present invention has been described in particular embodiments, it should be appreciated that the present invention should not be construed as limited by such embodiments, but rather construed according to the following claims.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and it's practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In a multi-processor server system, a method for processing a connection comprising:
    a) receiving a connection indicator packet on a listener of said server system wherein said connection indicator packet is associated with a connection to be established;
    b) in response to said connection indicator, generating a connection data structure for said connection to be established and assigning said connection to be established to a processor of said multi processor server;
    c) said connection to be established transmitting a first acknowledgement packet in response to said connection indicator wherein said listener is free to process subsequent packets;
    d) said connection to be established receiving a second acknowledgement packet to establish a connection path on said processor; and
    e) said connection path getting established with processing restricted to the said connection path and said connection path subsequently processing a plurality of data packets on said processor associated with said connection to be established, wherein said data packets are identified with said connection path based on said data structure.

2. The method as described in claim 1 wherein said connection path is a perimeter for processing data packets associated with said connection to be established.

3. The method as described in claim 2 wherein said perimeter is a defined set of modules that each packet of said connection is processed.

4. The method as described in claim 1 wherein said connection indicator is a SYN packet.

5. The method as described in claim 4 wherein said first acknowledgement packet is a SYN_ACK packet.

6. The method as described in claim 5 wherein said second acknowledgement packet is a SYN_ACK_ACK packet.

7. The method as described in claim 1 wherein said listener comprises a socket, TCP, or IP control block.

8. The method as described in claim 1 wherein said listener is not single threaded while processing said connection to be established.

9. The method as described in claim 1 wherein said data structure is a conn_t.

10. A computer system comprising a plurality of processors coupled to a bus and a memory coupled to a bus and comprising instructions that when executed, implement a method of connecting a multi-processor server to a client comprising:
 a) receiving a connection indicator packet on a listener of said server system wherein said connection indicator packet is associated with a connection to be established;
 b) in response to said connection indicator, generating a connection data structure defining a connection path for said connection and assigning said path to a processor of said multi processor server;
 c) said path transmitting a first acknowledgement packet in response to said connection indicator wherein said listener is free to process subsequent packets;
 d) said path receiving a second acknowledgement packet to establish said connection on said processor; and
 e) said path processing a plurality of data packets on said processor associated with said connection, wherein said data packets are identified with said path based on said data structure.

11. The computer system as described in claim 10 wherein said path is a perimeter for processing data packets associated with said connection.

12. The computer system as described in claim 11 wherein said perimeter is a defined set of modules that each packet of said connection is processed.

13. The computer system as described in claim 10 wherein said connection indicator is a SYN packet.

14. The computer system as described in claim 13 wherein said first acknowledgement packet is a SYN_ACK packet.

15. The computer system as described in claim 14 wherein said second acknowledgement packet is a SYN_ACK_ACK packet.

16. The computer system as described in claim 10 wherein said listener comprises a socket, TCP, or IP control block.

17. The computer system as described in claim 10 wherein said listener is not single threaded while processing said connection.

18. The computer system as described in claim 10 wherein said data structure is a T_CONN data structure.

19. A method for reducing load on an acceptor of a multi-processor server system comprising:
 a) receiving a connection indicator packet on said listener of said server system wherein said connection indicator packet is associated with a connection to be established;
 b) in response to said connection indicator, generating a connection data structure defining a connection path for said connection and assigning said path to a processor of said multi processor server;
 c) said path transmitting a first acknowledgement packet in response to said connection indicator wherein said listener is free to process subsequent packets;
 d) said path receiving a second acknowledgement packet to establish said connection on said processor; and
 e) said path processing a plurality of data packets on said processor associated with said connection, wherein said data packets are identified with said path based on said data structure.

20. The method as described in claim 19 wherein said path is a perimeter for processing data packets associated with said connection.

21. The method as described in claim 20 wherein said perimeter is a defined set of modules that each packet of said connection is processed.

22. The method as described in claim 19 wherein said connection indicator is a SYN packet.

23. The method as described in claim 22 wherein said first acknowledgement packet is a SYN_ACK packet.

24. The method as described in claim 23 wherein said second acknowledgement packet is a SYN_ACK_ACK packet.

25. The method as described in claim 19 wherein said listener comprises a socket, TCP, or IP control block.

26. The method as described in claim 19 wherein said listener is not single threaded while processing said connection.

27. The method as described in claim 19 wherein said data structure is a T_CONN data structure.

* * * * *